J. Y. SMITH.
ROCK DRILL

No. 47,870. Patented May 23, 1865.

Witnesses:
Jos. L. Coombs
J. Bain

Inventor:
J. Y. Smith
by A. Pollok
his atty

UNITED STATES PATENT OFFICE.

JOHN Y. SMITH, OF ALEXANDRIA, VIRGINIA.

IMPROVEMENT IN ROCK-DRILLS.

Specification forming part of Letters Patent No. 47,870, dated May 23, 1865.

*To all whom it may concern:*

Be it known that I, JOHN Y. SMITH, of Alexandria, in the county of Alexandria and State of Virginia, have invented certain new and useful Improvements in Drilling-Tools for Boring Wells, Piercing Rocks, and other Mining or Tunneling Operations; and I hereby declare the following to be a full, clear, and exact description of the same, reference being had to the accompanying drawings, in which—

Figure 1:
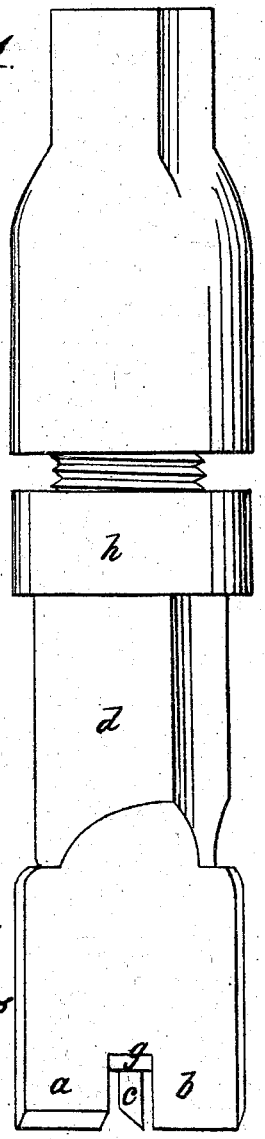
Figure 2:
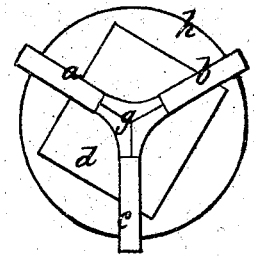

Figure 1 is an elevation, and Fig. 2 an inverted plan view, of a tool or instrument constructed in accordance with my invention.

Rock-drills as heretofore constructed and used for cutting rock or boring wells consisted, mainly, of a straight bit—*i. e.*, an ordinary chisel-edge equally beveled on both sides. The objections to such drills are too well known to require much comment. It may, however, be mentioned that the principal objections are, first, liability of their becoming wedged in crevices from which it is difficult and often impossible to extract the same, which frequently necessitates the abandonment of the work; second, liability of their becoming loose or unscrewed from their sockets, particularly under the action of rotation, which is always imparted to such drills; third, slow progress of the work; fourth, necessity of reaming the hole cut by such tools. Other drills have been made or suggested which, while obviating some of the objections stated, are subject to others peculiar to themselves. Thus the Z-drill is costly to make and liable to break at the angles, owing to the unequal temper to which such form of steel is necessarily liable.

The object of my invention, therefore, is to make a drill which, while it can be easily made and kept in working order—*i. e.*, sharpened or ground—is calculated to penetrate the rock or other hard substance with greater ease and rapidity than any other drill requiring no reamer, boring a truly circular hole, not being liable to become wedged in crevices, and having a tendency to tighten its joint in the socket, so that there is no danger of its getting detached from the auger-stock.

The drill, subject of this patent, is composed of three or more blades made in one piece radiating from a common center. These blades terminate at their lower ends in bevel-faces, constituting the cutting-edges. Centrally the blades are recessed, the under side of the recessed portion presenting on each blade bevel-faces on both sides. The blades are made in one piece with a shank which is preferably square, so that a common wrench may be used to screw the tool in or out of the socket. On the upper part the shank is provided with a collar and screw, whereby the tool is inserted and held in the socket of the auger-stock. The principal cutting-edges of the tool are formed by beveling the face of each blade at an angle such as will tend to impart a slight rotary motion to the drill upon its own axis in the direction of its screw-thread, so that each blow will only tighten the connection of the drill in its socket.

In the accompanying drawings the drill shown is composed of three blades, *a b c*, which radiate from the axis of the tool. They are made in one piece with the shank *d*, which is of a square cross-section, the metal at the point of connection being of proper concavity so as to diminish the resistance to the tool from water and accumulated earthy matters in the bottom of the well. At *g*—*i. e.*, at and toward the center—the blades are recessed, whereby greater ease in making and sharpening or repairing the tool is attained and greater strength to each cutter imparted. In the bottom of the recess the blades are double bevel-faced to cut up or triturate the core that is formed by the operation of the surrounding cutters. The collar *h*, in closing against the socket, will protect the screw.

Figure 3:
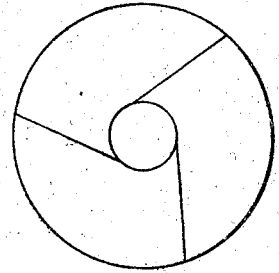

The construction of this drill may be modified without departure from the principle of my invention. Thus, instead of radiating the cutters from the center, they may be tangential to a circle inscribed within the area of the drill, as shown in Fig. 3.

Having thus fully described my invention and the manner in which the same is or may be carried into effect, I claim—

1. A rock-drill composed of three or more cutting-blades when recessed in the center or at the point of intersection of said blades, substantially as set forth.

2. Forming the cutting-edges of a three or more bladed rock-drill by beveling one side of said blades in such manner as to tend to rotate the drill when striking a blow and to tighten the screw-joint, substantially as set forth.

3. Forming cutting-edges upon the recessed portion of the blades, substantially as and for the purpose set forth.

In testimony whereof I have signed my name to this specification before two subscribing witnesses.

J. Y. SMITH.

Witnesses:
   EDM. F. BROWN,
   JOS. L. COOMBS.